United States Patent
Boice et al.

(10) Patent No.: US 7,512,181 B2
(45) Date of Patent: *Mar. 31, 2009

(54) SINGLE PASS VARIABLE BIT RATE CONTROL STRATEGY AND ENCODER FOR PROCESSING A VIDEO FRAME OF A SEQUENCE OF VIDEO FRAMES

(75) Inventors: Charles E. Boice, Endicott, NY (US); Krishna C. Ratakonda, Yorktown Heights, NY (US); Joseph G. Schaefer, Berkshire, NY (US); Joseph H. Underwood, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/127,119

(22) Filed: May 27, 2008

(65) Prior Publication Data

US 2008/0225943 A1 Sep. 18, 2008

Related U.S. Application Data

(63) Continuation of application No. 10/948,772, filed on Sep. 23, 2004.

(51) Int. Cl.
 H04N 7/12 (2006.01)
 H04N 11/02 (2006.01)
(52) U.S. Cl. .............................. 375/240.26; 375/240.02
(58) Field of Classification Search ....................... None
See application file for complete search history.

(56) References Cited

U.S. PATENT DOCUMENTS

| 5,231,484 | A | | 7/1993 | Gonzales et al. | |
|---|---|---|---|---|---|
| 5,978,029 | A | * | 11/1999 | Boice et al. | 375/240.14 |
| 6,222,881 | B1 | * | 4/2001 | Walker | 375/240.03 |
| 6,654,417 | B1 | * | 11/2003 | Hui | 375/240.03 |
| 6,915,018 | B2 | * | 7/2005 | Tajime | 382/251 |
| 6,970,506 | B2 | * | 11/2005 | Kim et al. | 375/240.01 |
| 2003/0095594 | A1 | * | 5/2003 | Laksono et al. | 375/240.03 |

OTHER PUBLICATIONS

A. Yoneyama et al., "One-Pass VBR MPEG Encoder Using Scene Adaptive Dynamic GOP Structure," IEEE Int. Conf. Cons. Elec., pp. 174-175, 2001.
S. Takamura et al., "MPEG-2 One-Pass Variable Bit Rate Control Algorithm and Its LSI Implementation," IEEE, 351-366, 2001.

* cited by examiner

*Primary Examiner*—David Czekaj
(74) *Attorney, Agent, or Firm*—Heslin Rothenberg Farley & Mesiti, PC (57) ABSTRACT

An encode control strategy is provided for variable bit rate encoding of a sequence of video frames in a single pass. The control strategy includes determining whether a video frame has a complexity level statistically outside a defined range from a complexity level of at least one preceding frame of the sequence of video frames, and if so, determining a new average bit rate target for the video frame. The new average bit rate for the video frame is determined employing at least one of spatial complexity and temporal complexity of the video frame. The new average bit rate target for the video frame is used to set frame level bit rate control parameter(s), and the video frame is encoded using the set frame level bit rate control parameter(s).

14 Claims, 4 Drawing Sheets fig. 1 fig. 2 fig. 3 fig. 4

SINGLE PASS VARIABLE BIT RATE CONTROL STRATEGY AND ENCODER FOR PROCESSING A VIDEO FRAME OF A SEQUENCE OF VIDEO FRAMES

CROSS-REFERENCE TO RELATED APPLICATION

This application is a continuation of co-pending U.S. patent application Ser. No. 10/948,772, filed Sep. 23, 2004, entitled "Single Pass Variable Bit Rate Control Strategy and Encoder for Processing a Video Frame of a Sequence of Video Frames", by Boice et al., the entirety of which is hereby incorporated herein by reference

TECHNICAL FIELD

This invention relates in general to the field of digital video compression, and more particularly, to an encode control strategy for single pass variable bit rate encoding of a sequence of video data frames to produce constant quality, wherein an average bit rate target for a video frame to be encoded is dynamically adjusted based on relative complexity of the video frame.

BACKGROUND OF THE INVENTION

The emergence of various digital video technologies in industries such as broadcast television, communications networks, consumer electronics, and multimedia computers continues to increase at a remarkable rate. This widespread use of applications is motivated by the fact that signal processing, editing and data transfer of digital information is much easier compared to performing the same tasks with analog representations. As importantly, digital video owes its popularity to the several standards that have been created for digital video compression.

Digital video compression solutions are arguably the most important component of any digital video platform. Since digital video is known to contain an enormous amount of information in uncompressed format, its manipulation, storage, and transmission can be very time consuming and expensive, if not prohibitive. As a result, digital video compression techniques are needed to reduce the overwhelming volume of data while preserving the perceptual quality of its content. A compatible video decompression scheme is then used to decompress the data for playback.

The MPEG-2 international standard formed by the Moving Pictures Expert Group, and described in ISO/IEC 13818-2, "Information Technology—Generic Coding of Moving Pictures and Associated Audio Information: Video, 1996," which is hereby incorporated herein by reference in its entirety, is intended to standardize compression for the industries noted above. The ISO MPEG-2 standard specifies the syntax of the encoded bit stream and semantics of the decoding process. The choice of coding parameters and trade-offs in performance versus complexity, however, are left to the encoder developer.

The efficiency of the MPEG-2 encoding system is assessed by the fidelity of the perceived video transmitted over a fixed communication bandwidth or stored into a digital medium. For some applications, such as digital satellite systems, multiple programs are multiplexed into a single large stream for broadcasting, and a bank of MPEG-2 encoders are used to monitor and encode all programs, while maintaining the quality of all received channels. The MPEG-2 stream is sent over either a fixed communications bandwidth or a dynamic bandwidth as in asynchronous transfer mode (ATM) networks. For home consumer video or PC applications, where the size of the storage media is limited, the user would like to accumulate as much information as possible, and an efficient encoding technique is beneficial to accomplishing this goal.

Video compression algorithms use various techniques to limit the amount of bits used to represent the video stream (or bit rate). Based on the nature of limits imposed on the bit rate, such techniques can broadly be classified into two categories: (1) constant bit rate (CBR) mode or (2) variable bit rate (VBR) mode. Most MPEG-2 encoders are developed to perform in CBR mode, where the average bit rate of the video stream is almost the same from start to finish. A video stream includes a plurality of pictures or frames of various types, such as I, B, and P picture types. A picture, depending on its type, may consume more or less bits than the set target rate of the video stream. The CBR rate control strategy has the responsibility of maintaining a bit ratio between the different picture types of the stream, wherein the desired average bit rate is satisfied, and a high quality video sequence is displayed. In CBR mode, the number of bits that can be transmitted to a video decoder in a given time interval is typically fixed. Furthermore, the video decoder uses a buffer of pre-specified size referred to as the video buffer verifier (VBV), to store the compressed video stream. Examples of this solution arise in over-the-air broadcast, cable transmission and satellite transmission of compressed video. These two restrictions inherently force the video compression (i.e., encoder) algorithm to restrict the amount of variability in the number of bits used to code successive video frames. Thus, this technique may produce visible artifacts in the decompressed video when it is used on long stretches of highly complex video.

Other encoders, including other MPEG-2 encoders, perform in the VBR mode. Variable bit rate encoding allows each compressed picture to have a different amount of bits based on the complexity of the intra and inter-picture characteristics. For example, the encoding of scenes with simple picture content (such as a color test pattern) will consume significantly fewer bits than scenes with complicated picture content (such as a crowded city street), in order to achieve the same picture quality. In VBR mode, the total number of bits used to compress a long stretch of video is typically fixed. However, the limits on instantaneous bit rate used to compress the video are practically non-existent. Examples of this situation arise in the case of video compressed to be stored on digital versatile discs (DVDs) or on the hard disk of a PC. As can be expected, VBR algorithms can compress video at a much higher quality than CBR algorithms at the same average bit rate.

CBR and VBR algorithms can be further subdivided into single pass or multi-pass algorithms. In the case of single pass algorithms, only a few frames of video (if any) succeeding the frame being compressed, are analyzed before deciding on the compression parameters to be used for the frame in question. Multi-pass algorithms use at least one trial pass through the video to determine the relative complexity of different portions of the video and then use this information to compress the video in a subsequent pass. VBR encoding algorithms are conventionally accomplished in non-real time using two or more passes. Multi-pass algorithms also conventionally offer better performance than single pass implementations. However, in the case of many applications, it is not possible to implement multiple passes through the video stream. For example, multi-pass encoders can not be used when compressing broadcast video and storing it on a hard drive, as applicable to popular consumer video appliances supplied by TIVO™ or Replay TV™. However, such devices can make use of VBR encoding, since the only practical restriction on the bit rate used to compress the video is the size of the hard disk. This is an application for which the concepts disclosed herein can be used advantageously.

To summarize, a need exists in the art for a novel single pass variable bit rate control strategy and encoder which provides enhanced performance and quality over prior encoding algorithms.

SUMMARY OF THE INVENTION

The shortcomings of the prior art are overcome and additional advantages are provided through a method of processing a video frame of a sequence of video frames. The method includes: determining whether a video frame has a complexity level statistically within a defined range of a complexity level of at least one preceding frame of a sequence of video frames; determining a new average bit rate target for the video frame when the video frame's complexity level is statistically outside the defined range of the complexity level of the at least one preceding frame, the determining of a new average bit rate target for the video frame employing at least one of spatial complexity and temporal complexity of the video frame; utilizing the new average bit rate target for the video frame to set at least one frame level bit rate control parameter; and encoding the video frame using the set frame level bit rate control parameter(s).

In further aspects, the determining of the new average bit rate target utilizes at least one of: (i) statistics derived from at least one of spatial complexity and temporal complexity of at least one preceding frame of the sequence of video frames; and (ii) reference video complexity level statistics determined prior to encoding of the sequence of video frames. The determining of the new average bit rate target for the video frame can include employing a modified average bit rate, the modified average bit rate being less than a simple average bit rate for the sequence of video frames, wherein the simple average bit rate is obtained by dividing a total target allocation for the sequence of video frames by the number of video frames in the sequence of video frames. As one example, the modified average bit rate may be 90% to 95% of the simple average bit rate. In a further aspect, an existing average bit rate target for a scene may be refined when the absolute average bit rate difference, determined by the existing average bit rate target less an actual number of bits used for encoding at least one preceding video frame of the scene, is greater than a defined threshold. In that case, the average bit rate target can be recalculated for the video frame and used to set the at least one frame level bit rate control parameter for the video frame.

Systems and computer program products corresponding to the above-summarized methods are also described and claimed herein.

Advantageously, the present invention is particularly useful for single pass variable bit rate applications, and can yield uniformly optimal compression performance (producing constant quality), irrespective of the nature of the video being encoded. The disclosed invention does not use direct modulation of the quantization step size (when compared with a casual average of quantization parameters) as a primary means for controlling the rate allocation among the different portions of video. Quantization step sizes only provide a measure of the relative complexity of the current frame with reference to the video frames already encoded. Thus, as explained further below, the true complexity of a video frame may not be represented in prior art single pass approaches, which may lead to sub-optimal allocation of available bits.

Further, the control strategy presented herein does not rely upon a lower bit rate limit being imposed on the target bit rates for each frame, and does not require frames to be encoded separately in a self-variable mode, nor are restrictions imposed on the grouping of frames.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a rate-control strategy for real-time single pass variable bit rate (VBR) encoding is provided, which may be readily incorporated in, for instance, an MPEG-2 compression system.

Figure 1:
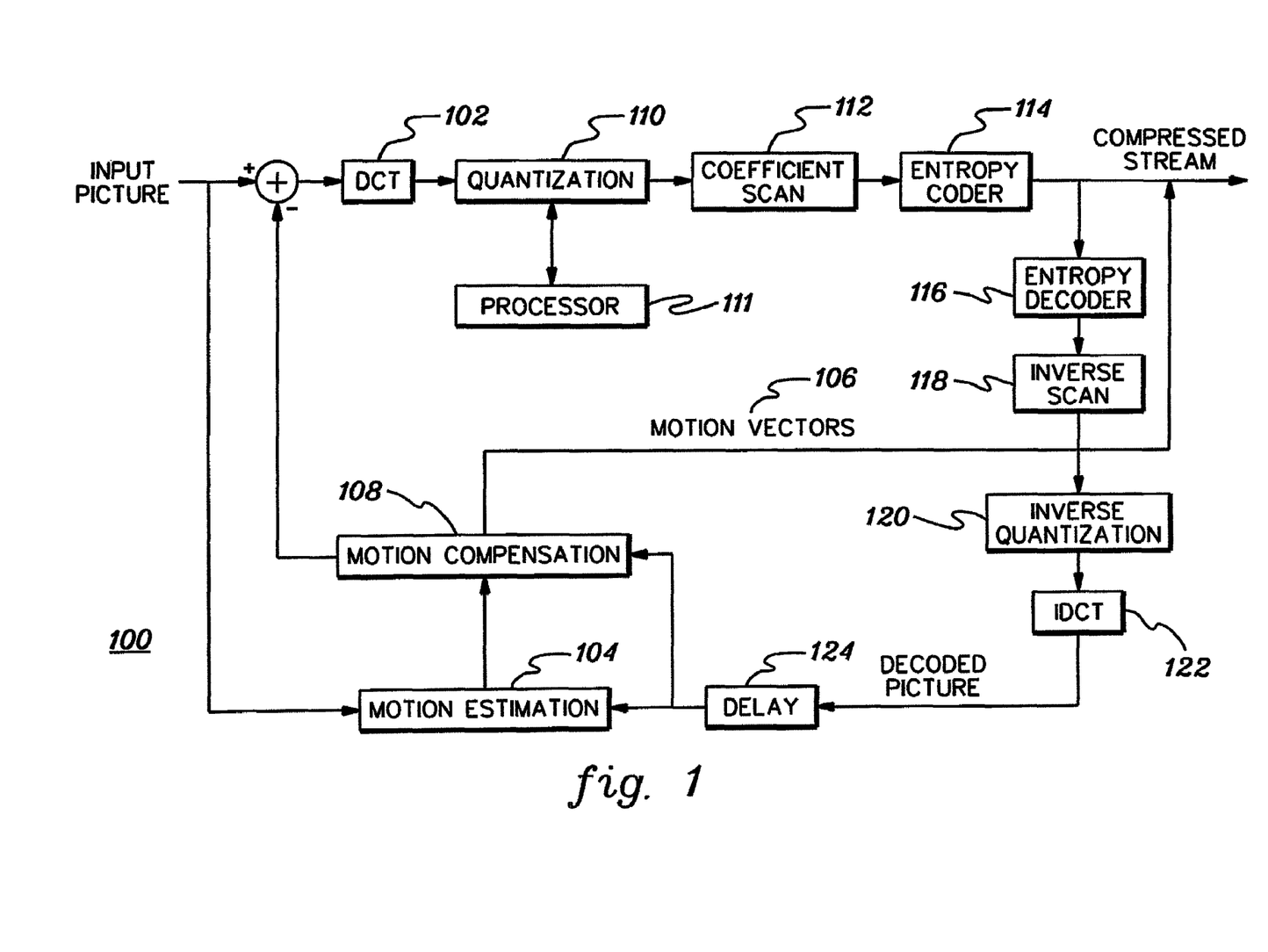
FIG. 1 depicts one example of a block diagram of an MPEG-2 encoder incorporating and using a real time single pass variable bit rate control strategy, in accordance with an aspect of the present invention.

One example of a block diagram of an MPEG-2 encoder 100 is shown in FIG. 1. FIG. 1 depicts various image and signal processing tasks used by the encoder to encode a video sequence and to decode the compressed sequence.

MPEG-2 encoder 100 is a sophisticated information processor including spatial and temporal image analyzers, quantizers, entropy encoders, and a rate control policy that ensures the creation of a fully compliant video stream which meets the demands of a chosen application. Each luminance picture of a video stream is partitioned into non-overlapping blocks of 16×16 pixels, which in turn are sub-divided into four 8×8 blocks. The two chrominance pictures result in four or two 8×8 blocks, depending on the 4:2:2 or 4:2:0 chrominance sampling. The set containing all luminance and chrominance blocks is called a macroblock (MB). A 4:2:2 macroblock has eight blocks, while the 4:2:0 macroblock has six. Each 8×8 block of pixels is transformed to frequency domain, using a two-dimensional discrete cosine transformation (DCT) 102. DCT is intended to perform an energy compaction on input blocks by obtaining classes of high priority (low) frequency coefficients and low priority (high) frequency coefficients. It is a fast and efficient way of removing some of the spatial redundancies of the image blocks.

Temporal redundancies are removed via a technique called motion estimation (ME) 104. With this scheme, any luminance macroblock can be predicted by moving a correspondent macroblock, which belongs to a previous picture, within a search window. The procedure of searching for the best macroblock match is defined as motion estimation. This best match (prediction) is then subtracted from the macroblock under consideration and a DCT transformation is applied to the macroblock difference. Further, a motion vector 106 is created, which points to the location of the predicted macroblock. The motion vector (MV) is used by both the encoder and the decoder to motion compensate (MC) 108 the corresponding macroblock and locate the best match.

Motion estimation is implemented only on the luminance portion of the macroblock, with the resulting motion vector scaled and used to motion compensate the chrominance block pairs. The encoding of the motion vectors is carried out, employing a technique known as differential pulse code modulation (DPCM), where a motion vector is predicted using the motion vector of a previously encoded macroblock, and only the difference between the motion vector and its prediction is encoded. Motion vector differences are represented with code words defined in look-up tables of the MPEG-2 standard.

The MPEG-2 standard uses I (Intra-Coded), P (Predicted) and B (Bidirectionally-Predicted) type pictures. The Intra-Coded I's use only the information within that picture, while the P-types employ the motion estimation and compensation tasks performed on previously encoded I or P types to predict a macroblock and compute a prediction error to be encoded. This is an efficient way of compression, since the motion compensated macroblock differences contain less information than the original macroblock. P types are often called forward predicted pictures, since they use previous pictures to make predictions forward in time.

B type pictures use information from both previous and future I or P types for forward and backward predictions and are particularly useful for estimating objects that move in different directions with different velocities. Further, the bidirectional motion estimation schemes used in B pictures are more robust in noisy environments, as compared to the casual prediction used for P types. This is because both predictions can be used simultaneously by averaging their nominal values.

The various picture types are quantized 110 by encoder 100 in several steps. First, a quantization matrix, unique to a picture type, is applied to an 8×8 DCT block. The elements (weights) of the matrix are chosen such that importance is given to low frequency coefficients. These coefficients contain more information and contribute more to the perceptual quality of the picture. Then, a quantization scaling factor is computed to classify the macroblocks into different classes, based on the local image activity, complexity of the picture type, and a measure of buffer fullness. This index is directly related to the number of bits allocated to a picture and its perceived quality. The actual number of bits is obtained by first scanning 112 each DCT block and then grouping the quantized alternate current (AC) coefficients together, according to the procedures defined in the MPEG-2 standard. Each group is entropy coded 114 with a unique variable length code (VLC), using a Huffman look-up table. Direct current (DC) coefficients are encoded, employing DPCM (similar to encoding of MV's) and uniform quantization.

The output of the entropy coder 114 is input to entropy decoder 116. The output of decoder 116 goes through an inverse scan 118, inverse quantization 120 and inverse discrete cosine transformation 122 to return a lossy version of the difference macroblock. The decoded picture is then passed through a delay 124 to motion estimation 104 and/or motion compensation 108, as is known in the art. Since the instantaneous rate of the compressed stream changes over time, a decoder buffer is used to absorb the rate fluctuations and convert the fixed channel rate into compressed picture bits and deliver it to an actual decoder for processing.

Encoder 100 further includes a rate control policy implemented by a processor 111 and used in the creation of a fully compliant stream that meets the demand of a chosen application. In accordance with an aspect of the present invention, the rate control policy of encoder 100 includes a variable bit rate (VBR) encoding scheme used to encode the frames of an input video sequence.

The operational functions of an MPEG-2 encoder are discussed in greater detail in commonly assigned, U.S. Pat. No. 6,118,823, entitled "Control Scheme for Shared-Use Dual-Port Predicted Error Array," which is hereby incorporated herein by reference in its entirety. The fundamentals of constant bit rate (CBR) and variable bit rate (VBR) encoding schemes are described with reference to frames or groups of pictures in detail in commonly assigned, U.S. Pat. No. 6,278,735 B1, entitled "Real-Time Single Pass Variable Bit Rate Control Strategy and Encoder," which is hereby incorporated herein by reference in its entirety. Adaptive encoding of a sequence of image frames using image statistics is described in commonly assigned U.S. Pat. Nos. 6,097,757; 6,040,861; and 5,978,029, which are each incorporated herein by reference in their entirety.

Various embodiments of a single pass variable bit rate control strategy and encoder in accordance with an aspect of the present invention are described below with reference to FIGS. 2-4.

Figure 2:
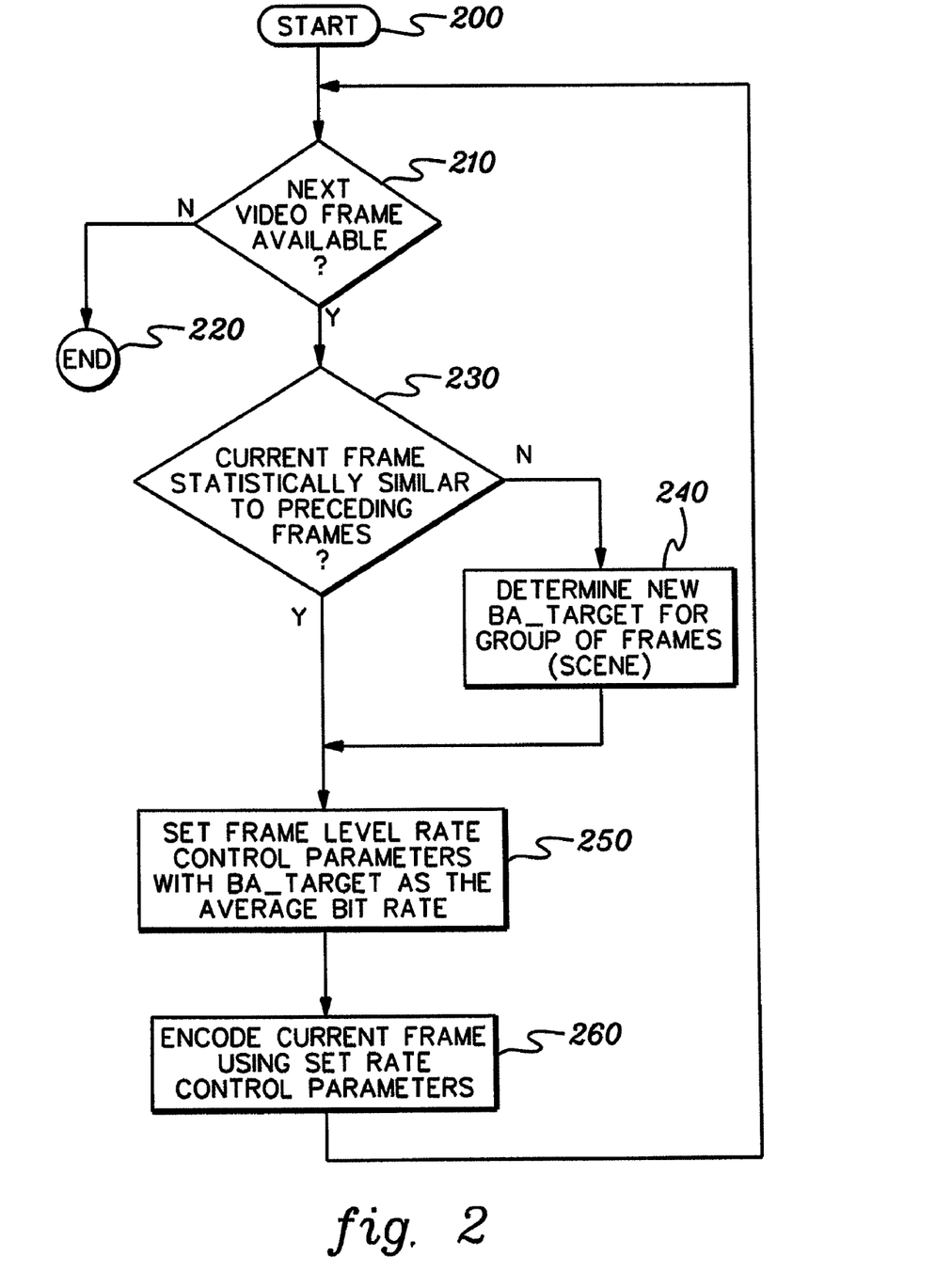
FIG. 2 depicts one embodiment of control strategy logic for processing a video frame of a sequence of video frames, in accordance with an aspect of the present invention.

One embodiment of control strategy logic for processing a video frame of a sequence of video frames in accordance with an aspect of the present invention is depicted in FIG. 2. The control logic of FIG. 2 is implementable via, for example, processor 111 of the MPEG-2 encoder depicted in FIG. 1. The logic of FIG. 2 starts 200 with a determination of whether there is a next video frame available for processing 210. If not, then all video frames of the sequence of video frames have been processed, and the logic terminates processing 220.

Assuming that a next frame remains to be processed, then the control logic determines whether the current video frame is statistically similar to one or more just preceding video frames 230. This inquiry seeks to determine whether the current video frame to be processed belongs to the same scene as the preceding video frame(s), or alternatively, whether there is a significant difference in motion content between the current video frame and the preceding video frame(s) of a scene. Numerous techniques exist in the art for determining whether a current video frame represents the start of a new scene in a sequence of video frames. For example, the absolute value difference between statistically evaluated complexity of the current video frame and one or more preceding video frames can be obtained and compared to a threshold. If the difference is greater than the threshold, then a new scene is identified.

Assuming that the current video frame to be processed is statistically similar to the just preceding frame(s), then an existing average bit rate target for the scene is employed to set (or confirm) the frame level bit rate control parameter(s) for the video frame 250. The bit rate control parameters may include, for example, the picture target, quantization level, and employ a standard rate control algorithm. One skilled in the art can readily implement this processing. By way of example, reference the Test Model 5 protocol set forth in the MPEG-2 standard, which describes simple rate control techniques. Further, reference U.S. Pat. No. 5,231,484, which is incorporated herein by reference in its entirety, for further rate control algorithm discussion. The current video frame is then encoded using the set bit rate control parameter(s) 260.

Assuming that the current video frame is statistically dissimilar from one or more just preceding video frames of the sequence of video frames by a predetermined threshold, then a complexity change is identified and a new average bit rate target (BA_TARGET) is determined for the new group of frames (e.g., the new scene) 240. Note that the new group of frames or new scene may contain one or more groups of pictures (GOPs). Once the new average bit rate target is determined 240, it is used to set new frame level bit rate control parameter(s) for the current video frame 250, which are then used to encode the current video frame 260. The control logic repeats until all video frames of the sequence of video frames have been encoded.

Figure 3:
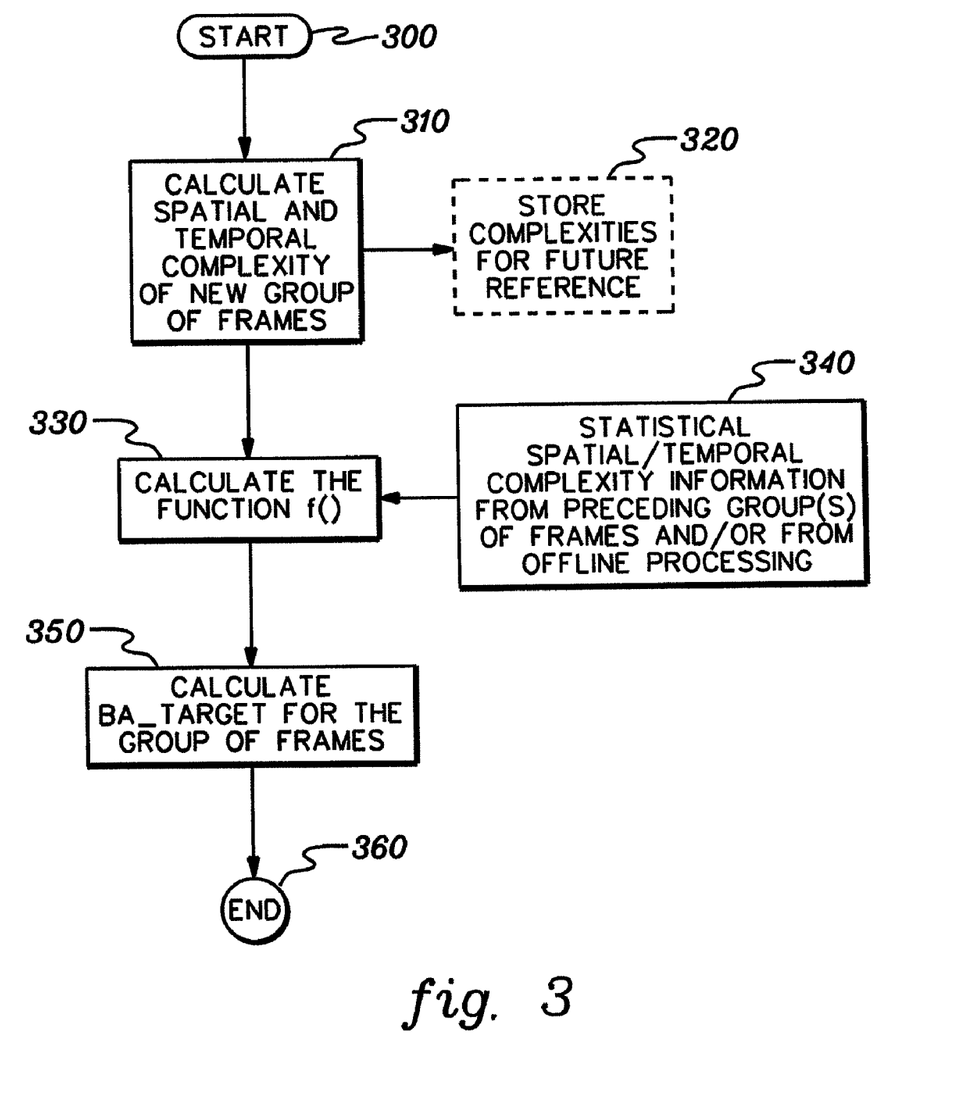
FIG. 3 depicts one embodiment of control logic for determining a new average bit rate target for a video frame to be encoded, in accordance with an aspect of the present invention.

One embodiment of control logic for determining a new average bit rate target (new BA_TARGET) is depicted in FIG. 3. Processing starts 300 with calculating/obtaining at least one of the spatial complexity and temporal complexity for the current video frame and thus for the new group of frames (e.g., new scene) 310. In one example, this complexity calculation is determined from the current video frame and a next one or two video frames to be encoded. If necessary, a minimal delay can be added to the encode process to allow time for these calculations. The frame complexity values can be stored (if desired) for future reference 320. Examples of spatial complexity (e.g., activity) indicators include measures proportional to the standard deviation of the luminance intensity of a video frame (PDIFF), or the standard deviation of the chrominance intensity of a video frame (CDIFF). These measurements may be employed for an entire video frame, or the video frame may be partitioned into several sub-regions, with a different measure taken for each sub-region.

Other measurements such as edge gradients, and texture complexity measurements may be used in lieu of, or in conjunction with, the above-noted measurements. The spatial complexity measurement for the current video frame being encoded is denoted herein as SPAT_COMP in the calculations below. Examples of temporal activity measurements include the difference between PDIFF and/or CDIFF values of successive frames. Such differences, in addition to the difference in average luminance/chrominance intensity of successive frames, are known to be good measurements of temporal activity. The temporal complexity measurement for the current video frame being encoded is denoted herein as TEMP_COMP in the calculations below, and is a measure for the rate of variation of the video content as a function of time. By way of further example, temporal complexity could be an average of the absolute value of the difference between a block of pixels in the current video frame and another block of pixels from the previous video frame(s) chosen to minimize the difference between the two blocks.

As an example, if the source video can be characterized as a Gaussian random variable, then the above-noted measurements would give a complete characterization of the nature of the video. In practical situations, such measurements may be supplemented by measurements of the difference between the video frame being encoded and its prediction as obtained through a process of motion compensation (referred to as the motion compensated frame difference or MCFD). Note that this temporal complexity characterization can be either performed with reference to part of the sequence of video data already compressed (and is therefore available for analysis), or on a collection of test video clips. The collection of test video clips comprises one example of reference video complexity level statistics which may be determined prior to encoding of the sequence of video frames.

The function $f(\ )$ is then calculated 330 using statistical spatial and/or temporal complexity information from one or more preceding video frames in one or more preceding groups of frames and/or from reference video complexity level statistics determined off-line prior to encoding of the sequence of video frames 340. The purpose of function $f(\ )$ is to provide a statistical evaluation of the complexity of the current frame relative to either a preceding video frame(s) and/or relative to known reference frame(s). The function $f(\ )$ can be readily customized by one skilled in the art as desired. One example is set forth as Equation 1 below.

$$f(\text{SPAT\_COMP}, \text{TEMP\_COMP}) = a \cdot (\text{SPAT\_COMP} - \text{AVG\_REF\_SPAT}) + b \cdot (\text{TEMP\_COMP} - \text{AVG\_REF\_TEMP}) \quad \text{Equation 1:}$$

Where:
 $f(\text{SPAT\_COMP}, \text{TEMP\_COMP}) = $ function $f(\ )$;
 SPAT_COMP=spatial complexity of current video frame;
 TEMP_COMP=temporal complexity of current video frame;
 a, b=appropriate proportionality constants which depend upon the choice of definitions for SPAT_COMP and TEMP_COMP;
 AVG_REF_SPAT=average spatial complexity evaluated over a reference group of frames; and
 AVG_REF_TEMP=average temporal complexity evaluated over a reference group of frames.

This comparison function is provided by way of example only. Numerous variations are possible. For example, there could be multiple groups of reference frames and a weighted average of the difference with respect to the groups could be employed, where the weighting is dependent on the level of similarity between the current video frame(s) and the groups of reference frames. Alternatively, each difference with respect to the average may not be a simple difference function, but may be weighted to have the behavior of a capacitor charging function (i.e., higher values of the difference have less impact than smaller values).

The function $f(\ )$ is then employed to modulate the rate allocation for the current video frame and subsequent video frames of the new group of frames. As noted above, in one aspect of this invention, the rate allocation occurs at a scene change. A "scene change" or video "shot change" is defined as an abrupt change in the nature of the video being encoded. Thus, in expectation of a possibly different complexity of video in the subsequent scene (group of frames), the rate allocation of target bits for the new scene is adjusted by comparing its spatial and temporal complexity with preceding scenes. In other embodiments, such a change in allocation need not occur only at scene changes, but may be used periodically, even in the absence of a scene change or when triggered by other events, such as when the number of frames left to be coded falls below a given limit.

Once the function $f(\ )$ is calculated, a new average bit rate target (BA_TARGET) is determined 350. One formula for calculating the new average bit rate target for the video frame, and hence for the new group of frames, is set forth below as Equation 2.

$$\text{BA\_TARGET} = (\text{BA\_MAX} - (\text{BA\_MOD\_AVG}/M)) \cdot f(\text{SPAT\_COMP}, \text{TEMP\_COMP}) + (\text{BA\_MOD\_AVG}/N) \quad \text{Equation 2:}$$

Where:
 BA_TARGET=new average bit rate target;
 BA_MAX=nominal maximum bit rate (which may be a multiple of BA_MOD_AVG);

BA_MOD_AVG=modified average bit rate attained by dividing a total target allocation for the sequence of video frames by the number of video frames in the sequence of video frames and then reducing that simple average bit rate by a fixed percentage;

M, N=constants; and $f$(SPAT_COMP, TEMP_COMP)=a function representing a comparison between the video frame's evaluated complexity statistics and at least one of the statistics derived from at least one preceding frame of the sequence and/or reference video complexity level statistics determined prior to encoding the sequence.

Note that M and N are numbers which may lie in the range of two to four, although larger or smaller numbers may also be used in alternate embodiments. Also note that the variable BA_MOD_AVG represents a modified average bit rate. In accordance with an aspect of the present invention, which is explained further below with reference to FIG. 4, the true (or simple) average bit rate (calculated by dividing the total target allocation by the number of video frames in the sequence of video frames), is not employed. Rather, a modified version of it is obtained by taking a lower (e.g., 5%-10% smaller) number to allow for variations in scene complexity towards the end of a sequence of video frames. BA_MAX is the nominal maximum bit rate, which is typically a multiple of BA_MOD_AVG. In alternate embodiments, the nominal maximum may be modulated as the sequence is encoded.

Figure 4:
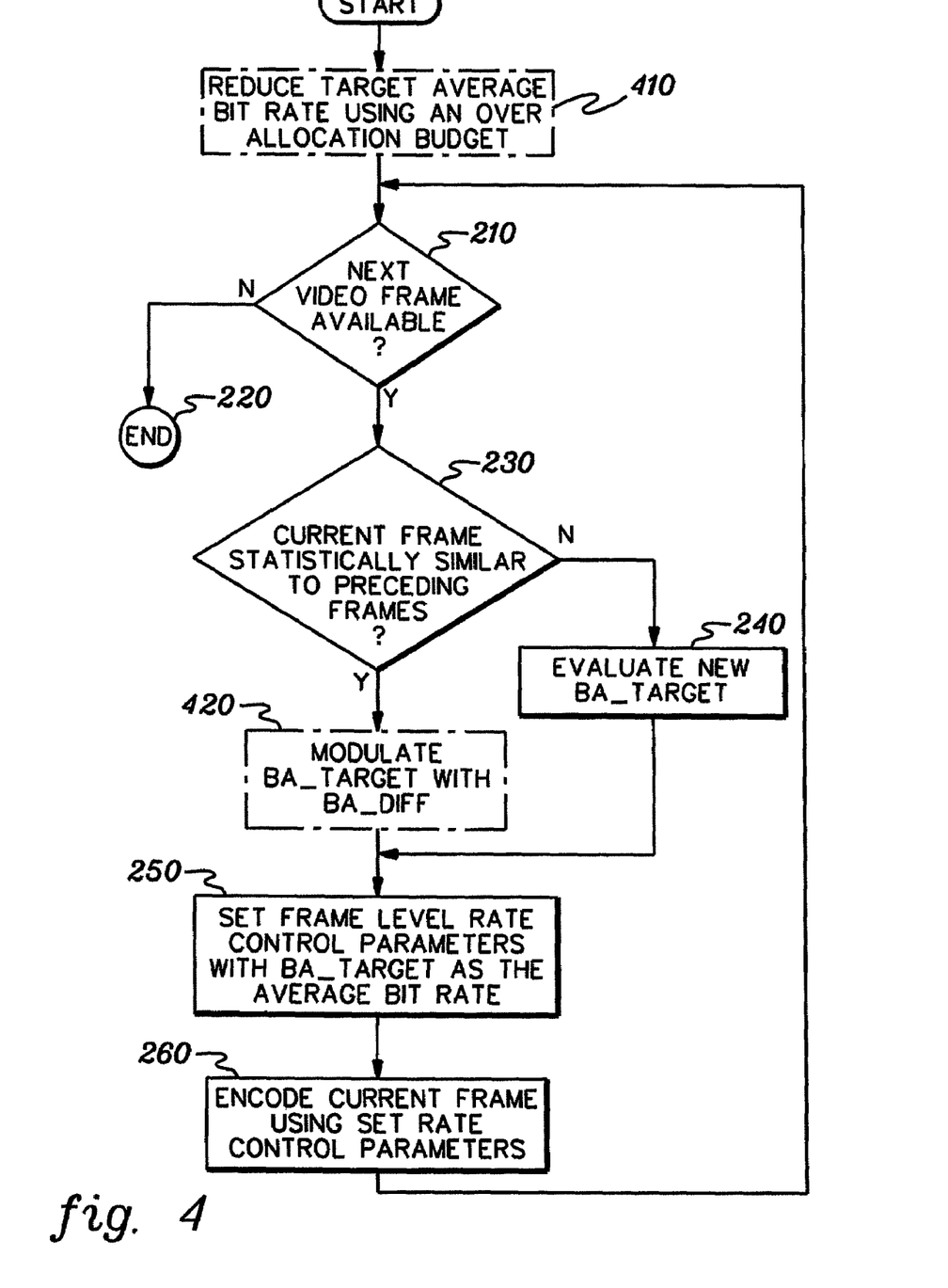
FIG. 4 depicts the control strategy logic embodiment of FIG. 2 for processing a video frame of a sequence of video frames, with several optional processing protocols shown, in accordance with an aspect of the present invention.

FIG. 4 depicts an alternate control strategy logic embodiment for processing a video frame of a sequence of video frames in accordance with an aspect of the present invention. In this alternate embodiment, the logic items numbered similarly to the control logic of FIG. 2 comprise identical or similar processing steps to these described above in connection with FIG. 2.

As noted above, a first optional processing variation is to reduce the target average bit rate for the entire sequence of video frames using an over-allocation budget 410. If N hours of video are to be stored on a medium with B bits of storage capacity, the simple average bit rate (in bits/second) available to code the sequence video is B/(N·3600). In a single pass VBR algorithm, reliance is placed on an ability to encode a certain portion of the video, which has a higher encoding complexity, at a higher bit rate than the average. In other words, bits are borrowed from video that is to be encoded in the future to encode the current video at an acceptable fidelity. Statistically, this is a reasonable supposition since the video sequence is expected to have both complex and simple portions. This algorithm, however, may not work properly as the end of the video sequence is approached, where the number of bits available to code the remaining portions of video becomes limited. Thus, a bit rate can be targeted that is less than the true or simple average, so that the algorithm can function properly, and if necessary, code the last portion of the video at a higher bit rate, thus insuring acceptable fidelity for the entire video sequence. This modified average bit rate (BA_MOD_AVG) may be any desired fixed percentage below the true average bit rate determined as B/(N·3600). By way of example, BA_MOD_AVG may be any percentage greater than 50% of the true average bit rate, with 90%-95% being a typical percentage range which may be used. For example, BA_MOD_AVG may be determined as (B·0.95)/(N·3600) if a 5% over-allocation budget is employed. Other implementations, in which BA_MOD_AVG is not a fixed fraction of the true average bit rate (BA_AVG) may alternatively be employed. For example, BA_MOD_AVG may be varied based on a portion of the sequence of video frames being encoded.

FIG. 4 depicts a further optional processing variation wherein logic is provided to adapt the existing average bit rate target for a scene or group of frames with changing complexity, even in the absence of a scene change 420. To this end, at the completion of each video frame encode, a measurement BA_DIFF is calculated as the difference between BA_TARGET and the actual number of bits used for the scene up to that point BA_USED, where BA_USED is the average number of bits used to code a video frame in the scene up to the current video frame. BA_DIFF represents the deviation from the expected target allocation. Thus, a positive value of BA_DIFF indicates that the available bits are being under utilized and the quality of the video can be increased, and vice versa for a negative value. Note that this measure may not be a direct difference between BA_TARGET and BA_USED, as may be the case in the presence of a repeat field or a complex pattern of temporally predicted (inter) and non-temporally predicted (intra) pictures within the current scene.

The BA_DIFF measurement may be used to modulate the average bit rate target which is to be used for modulating the target allocations for subsequent coded pictures in a group of frames. Thus, in the processing of FIG. 4, if the current frame is statistically similar to the preceding frames (e.g., is within the same scene as the preceding frame(s)), processing then determines whether to modulate the BA_TARGET employed by referencing BA_DIFF 420. If BA_DIFF is greater than some defined threshold, then there is the implication that the initial estimate of the average bit rate target for the sequence of frames is incorrect, and the BA_TARGET should be modified based on that feedback.

Those skilled in the art will note from the above discussion that disclosed herein is a predictive, single pass variable bit rate control strategy for producing constant quality encoding of a sequence of video frames. The control strategy automatically determines a new BA_TARGET for a group of frames (e.g., a new scene) for a first video frame of the scene based on inherent statistics of the sequence of video frames and compares these complexity measurements to, for example, complexity measurements derived from one or more preceding frames of the sequence of video frames, and/or from a collection of test video frames. Further, an over-allocation budget can be employed to conserve bits in comparison to a true average bit rate for the sequence of video frames. By reducing the initial average target bit rate by a small amount, the potential for poor quality video encoding at the end of the sequence of video frames is avoided.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for processing a video frame of a sequence of video frames, said system comprising:
   means for determining whether a video frame has a complexity level statistically within a defined range of a complexity level of at least one preceding frame of the sequence of video frames;
   means for determining a new average bit rate target for the video frame when the video frame complexity level is statistically outside the defined range of the complexity level of the at least one preceding frame, the means for determining the new average bit rate target for the video frame comprising means for employing at least one of spatial complexity and temporal complexity of the video frame;
   means for utilizing the new average bit rate target for the video frame to set at least one frame level bit rate control parameter;
   means for encoding the video frame using the set frame level bit rate control parameter(s);
   wherein the means for determining the new average bit rate target further utilizes at least one of:
   (i) statistics derived from at least one of spatial complexity and temporal complexity of at least one preceding frame of the sequence of video frames; and
   (ii) reference video complexity level statistics determined prior to encoding of the sequence of video frames;
   wherein the means for determining the new average bit rate target includes obtaining complexity statistics for at least one of spatial complexity and temporal complexity of the video frame and comparing the video frame's complexity statistics with at least one of the statistics (i) and the statistics (ii); and
   wherein the means for determining the new average bit rate target further comprises calculating the new average bit rate target as:

BA_TARGET=(BA_MAX−BA_MOD_AVG/$M$))·$f$(SPAT_COMP,TEMP_COMP)+(BA_MOD_AVG/$N$)

where:
   BA_TARGET=new average bit rate target;
   BA_MAX=nominal maximum bit rate (which may be a multiple of BA_MOD_AVG);
   BA_MOD_AVG=modified average bit rate attained by dividing a total target allocation for the sequence of video frames by the number of video frames in the sequence of video frames and then reducing that simple average bit rate by a fixed percentage;
   M, N=constants; and
   $f$(SPAT_COMP, TEMP_COMP)=a function representing a comparison between the video frame's complexity statistics and at least one of the statistics (i) and the statistics (ii).

2. The system of claim 1, wherein the means for determining the new average bit rate target further includes means for employing a modified average bit rate, the modified average bit rate being less than a simple average bit rate for the sequence of video frames, the simple average bit rate being obtained by dividing a total target allocation for the sequence of video frames by the number of video frames in the sequence of video frames.

3. The system of claim 2, wherein the modified average bit rate is a fixed percentage of the simple average bit rate in the range of 50% to 99%.

4. The system of claim 1, wherein when the video frame has a complexity level statistically within the defined range of complexity level of the at least one preceding frame of the sequence of video frames, the system further comprises means for recalculating an existing average bit rate target for encoding the video frame if an absolute average bit rate difference, determined as the existing average bit rate target less an actual number of bits used for encoding at least one preceding video frame of a scene containing the video frame, is greater than a defined threshold, and wherein the system further includes means for utilizing the recalculated average bit rate target for the video frame to set the at least one frame level bit rate control parameter for the video frame.

5. The system of claim 1, wherein the means for determining whether the video frame has a complexity level statistically within the defined range of a complexity level of at least one preceding frame in the sequence of video frames comprises means for determining whether the video frame begins a new scene in the sequence of video frames.

6. The system of claim 1, wherein spatial complexity of the video frame is quantified by determining at least one of a value proportional to the standard deviation of luminance intensity of the video frame (PDIFF) and a value proportional to the standard deviation of chrominance intensity of the video frame (CDIFF), and wherein the temporal complexity of the video frame is quantified by determining a difference between PDIFF values of successive video frames in the sequence of video frames or a difference between CDIFF values of successive video frames in the sequence of video frames.

7. The system of claim 1, wherein the system for processing comprises a single pass processing system.

8. At least one program storage device readable by a machine tangibly embodying at least one program of instructions executable by the machine to perform a method of processing a video frame of a sequence of video frames, the method comprising:
   determining whether a video frame has a complexity level statistically within a defined range of a complexity level of at least one preceding frame of the sequence of video frames;
   determining a new average bit rate target for the video frame when the video frame complexity level is statistically outside the defined range of the complexity level of the at least one preceding frame, the determining of a new average bit rate target for the video frame employing at least one of spatial complexity and temporal complexity of the video frame;
   utilizing the new average bit rate target for the video frame to set at least one frame level bit rate control parameter;
   encoding the video frame using the set frame level bit rate control parameter(s);
   wherein the determining the new average bit rate target further utilizes at least one of:
   (i) statistics derived from at least one of spatial complexity and temporal complexity of at least one preceding frame of the sequence of video frames; and (ii) reference video complexity level statistics determined prior to encoding of the sequence of video frames;

wherein the determining the new average bit rate target includes obtaining complexity statistics for at least one of spatial complexity and temporal complexity of the video frame and comparing the video frame's complexity statistics with at least one of the statistics (i) and the statistics (ii); and wherein the determining the new average bit rate target further comprises calculating the new average bit rate target as:

$$BA\_TARGET=(BA\_MAX-BA\_MOD\_AVG/M) \cdot f(SPAT\_COMP,TEMP\_COMP)+(BA\_MOD\_AVG/N)$$

where:
- BA_TARGET=new average bit rate target;
- BA_MAX=nominal maximum bit rate (which may be a multiple of BA_MOD_AVG);
- BA_MOD_AVG=modified average bit rate attained by dividing a total target allocation for the sequence of video frames by the number of video frames in the sequence of video frames and then reducing that simple average bit rate by a fixed percentage;
- M, N=constants; and
- $f$(SPAT_COMP, TEMP_COMP)=a function representing a comparison between the video frame's complexity statistics and at least one of the statistics (i) and the statistics (ii).

9. The at least one program storage device of claim 8, wherein the determining the new average bit rate target further includes employing a modified average bit rate, the modified average bit rate being less than a simple average bit rate for the sequence of video frames, the simple average bit rate being obtained by dividing a total target allocation for the sequence of video frames by the number of video frames in the sequence of video frames.

10. The at least one programs storage device of claim 9, wherein the modified average bit rate is a fixed percentage of the simple average bit rate in the range of 50% to 99%.

11. The at least one program storage device of claim 8, wherein when the video frame has a complexity level statistically within the defined range of complexity level of the at least one preceding frame of the sequence of video frames, the method further comprises recalculating an existing average bit rate target for encoding the video frame if an absolute average bit rate difference, determined as the existing average bit rate target less an actual number of bits used for encoding at least one preceding video frame of a scene containing the video frame, is greater than a defined threshold, and wherein the method further includes utilizing the recalculated average bit rate target for the video frame to set the at least one frame level bit rate control parameter for the video frame.

12. The at least one program storage device of claim 8, wherein the determining whether the video frame has a complexity level statistically within the defined range of a complexity level of at least one preceding frame in the sequence of video frames comprises determining whether the video frame begins a new scene in the sequence of video frames.

13. The at least one program storage device of claim 8, wherein spatial complexity of the video frame is quantified by determining at least one of a value proportional to the standard deviation of luminance intensity of the video frame (PDIFF) and a value proportional to the standard deviation of chrominance intensity of the video frame (CDIFF), and wherein the temporal complexity of the video frame is quantified by determining a difference between PDIFF values of successive video frames in the sequence of video frames or a difference between CDIFF values of successive video frames in the sequence of video frames.

14. The at least one program storage device of claim 8, wherein the method of processing of the video frame comprises single pass processing of the video frame.

* * * * *

UNITED STATES PATENT AND TRADEMARK OFFICE
CERTIFICATE OF CORRECTION

PATENT NO. : 7,512,181 B2 Page 1 of 1
APPLICATION NO. : 12/127119
DATED : March 31, 2009
INVENTOR(S) : Boice et al.

It is certified that error appears in the above-identified patent and that said Letters Patent is hereby corrected as shown below:

Claim 1, Col. 11, Line 49: Delete "BA_TARGET= (BA,MAX_BA_MOD_AVG/$M$)" and insert -- (BA_TARGET= (BA,MAX-BA_MOD_AVG/$M$) --

Signed and Sealed this

Sixteenth Day of June, 2009

JOHN DOLL
*Acting Director of the United States Patent and Trademark Office*